US007150924B2

(12) United States Patent
Narita

(10) Patent No.: US 7,150,924 B2
(45) Date of Patent: Dec. 19, 2006

(54) METAL BASED RESISTANCE HEATING ELEMENT AND METHOD FOR PREPARATION THEREFOR

(75) Inventor: Toshio Narita, Hokkaido (JP)

(73) Assignee: Agency of Industrial Science and Technology, Saitama (JP)

( * ) Notice: Subject to any disclaimer, the term of this patent is extended or adjusted under 35 U.S.C. 154(b) by 0 days.

(21) Appl. No.: 10/519,802

(22) PCT Filed: Jun. 30, 2003

(86) PCT No.: PCT/JP03/08334

§ 371 (c)(1), (2), (4) Date: Aug. 19, 2005

(87) PCT Pub. No.: WO2004/004418

PCT Pub. Date: Jan. 8, 2004

(65) Prior Publication Data

US 2005/0287388 A1 Dec. 29, 2005

(30) Foreign Application Priority Data

Jul. 1, 2002 (JP) ............................ 2002-191587

(51) Int. Cl.
*B32B 15/01* (2006.01)
*B32B 15/04* (2006.01)
*B32B 15/20* (2006.01)
*B05D 3/02* (2006.01)

(52) U.S. Cl. ...................... 428/655; 428/610; 428/650; 428/670; 428/680; 428/450; 427/383.3; 427/383.7; 228/262.5; 228/262.7

(58) Field of Classification Search ................ 428/610, 428/650, 651, 652, 655, 666, 660, 446, 450, 428/457, 662, 663, 670, 680; 228/59, 262.7, 228/262.5, 262.1; 427/375, 376.4, 376.6, 427/376.7, 383.1, 383.3, 383.7, 376.8
See application file for complete search history.

(56) References Cited

U.S. PATENT DOCUMENTS

| | | | | |
|---|---|---|---|---|
| 6,299,986 B1 * | 10/2001 | Meelu | ........................ | 428/615 |
| 6,461,746 B1 * | 10/2002 | Darolia et al. | .............. | 428/632 |
| 2005/0064227 A1 * | 3/2005 | Narita et al. | ................ | 428/655 |

FOREIGN PATENT DOCUMENTS

| | | | |
|---|---|---|---|
| JP | 5-299156 | | 11/1993 |
| JP | 9-245940 | | 9/1997 |
| JP | 11-228244 | | 8/1999 |
| WO | WO 03/038152 | * | 5/2003 |

* cited by examiner

*Primary Examiner*—Michael E. Lavilla
(74) *Attorney, Agent, or Firm*—Westerman, Hattori, Daniels & Adrian, LLP.

(57) ABSTRACT

Discloses is a metal-based resistance heat-generation element. The element comprises a core made of a platinum group metal or refractory metal, and a coating film formed on the core. The coating film has at least two layers including a core-side inner layer of a Re—Cr based σ (sigma) phase and a surface-side outermost layer of an aluminide or silicide. Alternatively, the element may comprise a core made of an alloy containing a platinum group metal or refractory metal and Re and Cr diffused therein, and a coating film formed on the core. The coating film has at least one layer including an aluminide or silicide layer.

8 Claims, 5 Drawing Sheets

(1)

(2)

METAL BASED RESISTANCE HEATING ELEMENT AND METHOD FOR PREPARATION THEREFOR

TECHNICAL FIELD

The present invention relates to a metal-based resistance heat-generation element capable of covering a wide temperature range of room temperature to 2000° C. or more, and usable in various atmospheres (such as oxidation, reduction, vacuum or corrosion atmosphere), and to a method for producing the element.

BACKGROUND ART

A Ni—Cr alloy and a Fe—Al—Cr alloy are widely used as a metal-based electrical-resistance heat-generation element, and their critical heat-resistant temperatures are 1100° C. and 1250° C., respectively. Platinum or platinum alloy having heat/corrosion resistances and excellent workability is used as a material of an electrical-resistance heat-generation element for various analytical instruments or the like, capable of precisely controlling the temperature thereof in a temperature range up to 1600° C.

However, these elements have disadvantages, such as reduction in thickness due to oxidative wear caused by a high-temperature oxidation atmosphere, embrittlement caused by a reduction atmosphere containing a carbon compound, and sulfur corrosion caused by a sulfur-containing atmosphere (hydrogen sulfide, sulfur dioxide, etc.).

There has also been known an electrical-resistance heat-generation element made of a refractory metal, such as tungsten or tantalum, having more excellent heat resistance, which is usable in a temperature range of room temperature to 2000° C. or more. However, this element has to be limitedly used in a high-vacuum environment due to its poor oxidation resistance. Moreover, the element made of a refractory metal cannot be used in a harsh environment, because the occurrence of a defect in its surface layer leads to a catastrophic oxidation in the inside thereof. In order to allow such a refractory metal to be used even in an oxidation atmosphere for a long period of time, an electrical-resistance heat-generation element has been proposed which comprises a refractory-metal core and a zirconia coating film formed on the core (Japanese Patent Laid-Open Publication No. 05-299156).

A silicon carbide heat-generation element and a molybdenum disilicide heat-generation element are known as a nonmetal-based heat-generation element, and used in oxidation atmospheres in temperature ranges up to 1650° C. and 1750° C., respectively. However, each of the elements made of such a brittle material has disadvantages of poor workability and low thermal shock resistance. Moreover, the use of a carbon-based heat-generation element in an oxidation atmosphere is restricted due to oxidative wear.

A rhenium metal has a high melting point next to that of tungsten, and an electrical resistance which is 2 to 4 times greater than that of a platinum-group metal or a refractory metal. Such high melting point and electrical resistance are desirable properties as a material of a heat-generation element, particularly of a foil strip or an extra fine wire, and thus the rhenium metal has great potential as a material of a resistance heat-generation element to be used at an ultrahigh temperature. However, the rhenium metal has low oxidation resistance, and poor workability due to its brittleness.

DISCLOSURE OF INVENTION

It is an object of the present invention to provide a metal-based resistance heat-generation element using a rhenium alloy coating film formed on a core made of a platinum-group metal or refractory metal to achieve excellent heat resistance and high-temperature corrosion resistance.

Specifically, according to a first aspect of the present invention, there is provided a metal-based resistance heat-generation element excellent in heat resistance and high-temperature corrosion resistance, which comprises a core made of a platinum-group metal or refractory metal, and a coating film formed on the core. The coating film has at least two layers including a core-side inner layer of a Re—Cr based σ (sigma) phase and a surface-side outermost layer of an aluminide or silicide.

According to a second aspect of the present invention, there is provided a metal-based resistance heat-generation element excellent in heat resistance and high-temperature corrosion resistance, which comprises a core made of an alloy containing a platinum-group metal or refractory metal and Re and Cr diffused therein, and a coating film formed on the core. The coating film has at least one layer including an aluminide or silicide layer.

According to a third aspect of the present invention, there is provided a method for producing a metal-based resistance heat-generation element excellent in heat resistance and high-temperature corrosion resistance, which comprises the steps of forming a material made of a platinum-group metal or refractory metal into a member having an intended shape, coating the member with a film made of a Re—Cr alloy or a bilayer film consisting of a Re layer and a Cr layer, subjecting the film-coated member to a heat treatment to allow the film to be formed as an inner layer of a Re—Cr based σ (sigma) phase, and subjecting the heat-treated member to an aluminum or silicon diffusion coating to form an aluminide or silicide layer on the inner layer.

The method set forth in the third aspect of the present invention may include the step of forming a Cr film and an Al film on the inner layer of the Re—Cr based σ (sigma) phase. In this case, the step of subjecting the heat-treated member to an aluminum or silicon diffusion coating may include subjecting the member with the Cr and Al films to an aluminum diffusion coating at a given high temperature to allow the Cr and Al films to be formed as a Cr-aluminide layer.

Alternatively, the method may include the step of forming a Re film and an Al film on the inner layer of the Re—Cr based σ (sigma) phase. In this case, the step of subjecting the heat-treated member to an aluminum or silicon diffusion coating may include subjecting the member with the Re and Al films to an aluminum diffusion coating at a given high temperature to allow the Re and Al films to be formed as a Re-aluminide layer.

Alternatively, the method may include the step of forming a Re film on the inner layer of the Re—Cr based a (sigma) phase. In this case, the step of subjecting the heat-treated member to an aluminum or silicon diffusion coating may include subjecting the member with the Re film to a silicon diffusion coating to allow the Re film to be formed as a Re-silicide layer.

According to a fourth aspect of the present invention, there is provided a method for producing a metal-based resistance heat-generation element excellent in heat resistance and high-temperature corrosion resistance, which comprises the steps of forming a material made of a platinum-group metal or refractory metal into a member having an intended shape, coating the member with a film made of a Re—Cr alloy or a bilayer film consisting of a Re layer and a Cr layer, subjecting the film-coated member to a heat treatment to diffuse Re and Cr into the member so as to convert the member into a platinum-group or refractory metal-Re—Cr alloy, and subjecting the alloyed member to an aluminum or silicon diffusion coating to form an aluminide or silicide layer on the alloyed member.

The method set forth in the fourth aspect of the present invention may include the step of forming a Cr film and an Al film on the platinum-group or refractory metal-Re—Cr alloy. In this case, the step of subjecting the alloyed member to an aluminum or silicon diffusion coating may include subjecting the alloyed member with the Cr and Al films to an aluminum diffusion coating at a given high temperature to allow the Cr and Al films to be formed as a Cr-aluminide layer.

Alternatively, the method may include the step of forming a Re film on the platinum-group or refractory metal-Re—Cr alloy. In this case, the step of subjecting the alloyed member to an aluminum or silicon diffusion coating includes subjecting the alloyed member with the Re film to a silicon diffusion coating to allow the Re film to be formed as a Re-silicide layer.

A material of a core of the resistance heat-generation element is a platinum-group metal (Pt, Ir, Rh or Ru etc.) or a refractory metal (W, Ta, Mo or Nb etc.). As long as intended effects of the resistance heat-generation element of the present invention are not spoiled, the metal may include a small amount of alloy content.

In a process of producing the resistance heat-generation element of the present invention, the material made of a platinum-group or refractory metal is firstly formed into a member having an intended shape, and then the member serving as a core is coated with a film made of a Re—Cr alloy or a bilayer film consisting of a Re layer and a Cr layer. Then, the film-coated member is subjected to a heat treatment to allow the film to be formed as a layer consisting of a Re—Cr based a (sigma) phase.

Preferably, the Re—Cr alloy film or the bilayer film consisting of Re and Cr layers is coated through electroplating of Re—Cr alloy or double electroplating of Re and Cr. For example, the electroplating of Re—Cr alloy may be carried out by the following process.

A heat-resistant glass electrolysis vessel 1 (inner volume: one liter) is prepared, and an electrolytic bath having the following composition is formed in the vessel. The composition of the electrolytic bath: 63 mol % of $AlCl_3$, 20 mol % of NaCl, and 17 mol % of KCl.

Then, 0.1 to 5 wt % of $ReCl_4$ and 0.1 to 5 wt % of $CrCl_3$ are added to the electrolytic bath in the electrolysis vessel 1, and the plating is performed at various electrolytic potentials while stirring the electrolytic bath at 0.3 m/s and maintaining the temperature of the electrolytic bath at 160° C.

The Re—Cr alloy film contains Cr in a range allowing a Re—Cr based σ-phase to be formed (in the range of 40 to 60 atomic %), preferably at about 50 atomic %. While the rhenium alloy film is formed through an electroplating process in an after-mentioned example, the present invention is not limited to the electroplating process, but the rhenium alloy film may be formed through any other suitable process, such as CVD, PVD or sputtering.

For example, the electroplating of Re may be performed by adding 0.1 to 5 wt % of $ReCl_4$ to the aforementioned electrolytic bath in the electrolysis vessel 1, and depositing Re at various electrolytic potentials while stirring the electrolytic bath at 0.3 m/s and maintaining the temperature of the electrolytic bath at 160° C. The electroplating of Cr may be performed using a conventional Sargent bath.

After the formation of the Re—Cr alloy film, the plated film is subjected to an intermediate heat treatment in a vacuum or inert gas atmosphere. This heat treatment may be performed through any suitable heating process, such as an electric current heating process or a heating process using a conventional electric furnace. In the electric current heating process, a current mainly flows through the core to heat the core. Through the intermediate heat treatment, a layer consisting of a Re—Cr based a (sigma) phase is formed on the core, or the core and the Re—Cr plated layer are diffused in one another to convert the core to a platinum-group or refractory metal (hereinafter referred to as "core metal")—Re—Cr alloy.

In the former case of forming the layer consisting of a Re—Cr based a (sigma) phase, the Re—Cr alloy film is heated up to 1300° C. at a heating rate of 10° C./min, for example, through an electric current heating process, and held for 1 to 10 hours. Preferably, the holding time is set at about 2 hours. It is essential to prevent the peeling/dropout of the Re—Cr alloy film during heating. The formation of some cracks is permissible. Through the intermediate heat treatment, a defect, such as cracks, in the Re—Cr alloy film, is repaired, and the Re—Cr alloy film is formed as a continuous layer consisting of a Re—Cr based a (sigma) phase.

In the latter case of converting the core to a core metal-Re—Cr alloy, a mutual diffusion is developed from the interface between the core and the Re—Cr alloy film, and the core is converted to a core metal-Re—Cr alloy. For this purpose, it is desirable to heat the core up to a temperature just below the melting point of the core metal.

After the completion of the intermediate heat treatment, the heat-treated member is subjected to an aluminum or silicon diffusion coating. The aluminum or silicon diffusion treatment may be performed through a pack cementation process, or an immersion coating process using molten Al or Si may be used. Alternatively, the heat-treated member may be subjected to an aluminum diffusion coating through an Al—Cr alloy plating process using a molten salt bath.

Alternatively, a Cr film and an Al film may be formed on the layer consisting of a Re—Cr based σ (sigma) phase, and then subjected to a heat treatment at a high temperature to allow the Cr and Al films to be formed as a Cr-aluminide layer. The heat treatment temperature is set in the range of 800 to 1300° C., preferably at about 1000° C. In this case, the Cr film has a thickness of about 5 to 30 μm, preferably about 10 μm. An insufficient amount of Cr causes difficulties in forming a continuous Cr (Al) layer, and an excessive amount of Cr undesirably leads to the occurrence of crack and/or peeling under heat cycle. The Cr is mainly formed as an alloy with Re. Almost no Al is incorporated into-Re or Re alloy as a solid solution. During the heat treatment, a part of Al escapes from the film in the form of vapor.

Alternatively, a Re film and an Al film may be formed on the layer consisting of a Re—Cr based σ-phase, and then subjected to a heat treatment at a high temperature to allow the Re and Al films to be formed as a Re-aluminide layer. The heat treatment temperature is set in the range of 800 to 1300° C., preferably at about 1000° C. In this case, the Re film has a thickness of about 5 to 30 μm. An insufficient amount of Re causes difficulties in forming a continuous Re—Al layer, and an excessive amount of Re undesirably leads to the occurrence of crack and/or peeling under heat cycle.

Alternatively, a Re film may be formed on the layer consisting of a Re—Cr based σ (sigma) phase, and then subjected to a silicon diffusion coating to allow the Re film to be formed as a Re-silicide layer. In this case, the Re film has a thickness of about 5 to 30 μm. An insufficient amount of Re causes difficulties in forming a continuous Re—Si layer, and an excessive amount of Re undesirably leads to the occurrence of crack and/or peeling under heat cycle.

BEST MODE FOR CARRYING OUT THE INVENTION

INVENTIVE EXAMPLE 1

A resistance heat-generation element comprising a core of Pt and a coating film with an inner layer of Re (Cr—Pt) and an outer layer of Re—Cr-aluminide was produced through the following process, and subjected to a test for oxidation resistance.

A Pt wire ((ϕ 100 μm) was prepared, and firstly formed into a wire member having an intended shape. 0.4 wt % of $ReCl_4$ and 0.4 wt % of $CrCl_3$ were added to an electrolytic bath (63 mol % of $AlCl_3$, 20 mol % of NaCl, and 17 mol % of KCl) received in a heat-resistant glass electrolysis vessel 1 (inner volume: one liter), and an electroplating process was performed using the Pt wire member and a platinum electrode, respectively, as negative and counter electrodes, while stirring the electrolytic bath at 0.3 m/s and maintaining the temperature of the electrolytic bath at 160° C., to form a Re—Cr alloy film containing 50 atomic % of Cr and having a thickness of 10 μm, on the wire member. The potential of the sample electrode was ±0.0 V relative to an Al reference electrode.

The Pt wire member coated with the Re—Cr alloy film was subjected to an intermediate heat treatment. Specifically, the film-coated wire member was heated up to 1300° C. at a heating rate of 110° C./min through an electric current heating process in an inert gas atmosphere, and held for 2 hours. Then, a Cr film having a thickness of 10 μm was formed on the heat-treated Re—Cr alloy layer through an electroplating process using a conventional Sargent Cr-plating bath.

Then, based on the aforementioned electrolytic bath (63 mol % of $AlCl_3$, 20 mol % of NaCl, and 17 mol % of KCl) in the electrolysis vessel 1, an electroplating process was performed using the Pt wire member formed with the Re—Cr alloy layer and the Cr film, and an Al metal having a purity of 99.9 atomic %, respectively, as negative and positive electrodes, while maintaining the temperature of the electrolytic bath at 160° C., to form an Al film having a thickness of 5 μm, on the Cr film. The potential of the sample electrode was −0.10 V relative to an Al reference electrode.

Figure 1:
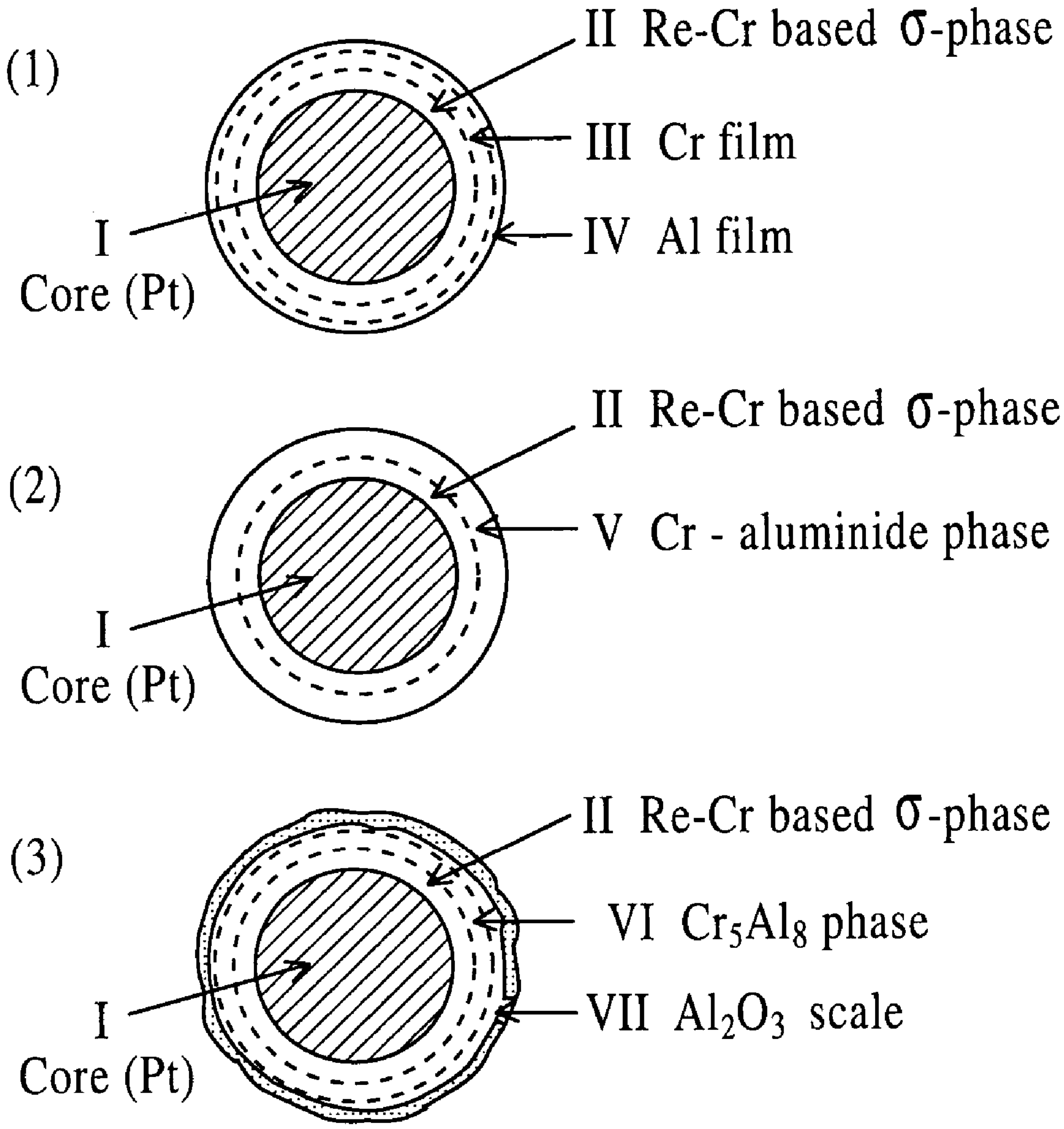
FIGS. 1-(1) to 1-(3) are schematic sectional views showing a wire member in each production process of a resistance heat-generation element in Inventive Example 1 (FIGS. 1-(1) and 1-(2)), and the wire member after an oxidation test (FIG. 1-(3)).

FIG. 1-(1) is a schematic sectional view showing the structure of the obtained wire member. As illustrated in FIG. 1-(1), a coating film having at least three layers is formed on the periphery of the Pt core I. More specifically, the coating film comprises a core I-side inner layer of the Re—Cr based σ-phase II, an outer layer of the Cr film III, and an outermost layer of the Al film IV.

Then, the wire member was heated up to 600° C. at a heating rate of 10° C./min through an electric current heating process in an inert gas atmosphere, and held for 4 hours. Successively, the wire member was heated up to 1300° C. and held for 1 hour.

FIG. 1-(2) is a schematic sectional view showing the structure of the obtained wire member. As illustrated in FIG. 1-(2), the core I and the inner layer of the coating film are maintained in Pt and Re—Cr based a (sigma) phase II, respectively. The Cr film III of the outer layer of the coating film and the Al film IV of the outermost layer of the coating film were formed as an outer layer of a Cr-aluminide phase V containing 75 atomic % of Al, through the reaction therebetween.

<Oxidation Test>

An oxidation test was performed by exposing the Pt wire member with the aforementioned coating film in the normal atmosphere at a temperature of 1300° C. for up to 1000 hours. For comparison, a Pt wire member having no coating film was subjected to the same test. The test result is shown in Table 1.

TABLE 1

| Holding Time | Amount of Corrosion ($mg/cm^2$) | |
|---|---|---|
| (hour) | Pt-Re member | Pt member |
| 100 | 1.0 | −0.4 |
| 250 | 1.7 | −1.0 |
| 500 | 2.1 | −2.0 |
| 1000 | 3.5 | −3.9 |

The negative value indicates the reduction in mass.

The negative value indicates the reduction in mass.

The sectional structure of the Pt/Re (Cr)/Al—Cr wire member subjected to the oxidation test was observed to measure the concentration of each element contained in each of the layers using an EPMA (Electron Probe Microanalysis) apparatus. FIG. 1-(3) is a schematic sectional view showing the structure of the Pt wire member after the test. As seen in FIG. 1-(3), the sectional structure is analogous to that in FIG. 1-(2), or is not changed even after the exposure to the high-temperature atmosphere. However, as compared with FIG. 1-(2), the Cr-aluminide phase V in the outer layer of the coating film was converted to a $Cr_5Al_8$ phase VI.

As can be seen from the above result, the Pt/Re (Cr)/Al—Cr wire member in Inventive Example 1 is oxidized according to a parabolic rule, and protected by a protective $Al_2O_3$ scale VII. In contrast, as shown in Table 1, the mass of the Pt wire member having no coating film is linearly reduced due to oxidative wear. This means that the Pt wire member becomes thinner.

INVENTIVE EXAMPLE 2

A resistance heat-generation element comprising a core of Pt and a coating film with an inner layer of Re (Cr—Pt) and an outer layer of Re-aluminide was produced through the following process, and subjected to a test for corrosion resistance.

A Pt wire member was subjected to an electroplating process under the same conditions as those in Inventive Example 1 to form a Re—Cr alloy film thereon, and then subjected to an intermediate heat treatment. Then, 0.4 wt % of $ReCl_4$ was added to the same electrolytic bath as that in Inventive Example 1. Under the condition that the potential of a sample electrode is ± 0.0 V relative to an Al reference electrode, an electroplating process was performed while stirring the electrolytic bath at 0.3 m/s and maintaining the temperature of the electrolytic bath at 160° C., to form a Re film having a thickness of 10 μm, on the Re—Cr alloy layer.

Then, based on the above electrolytic bath in the electrolysis vessel 1, an electroplating process was performed using the Pt wire member formed with the Re—Cr alloy layer and the Re film as a negative electrode, while stirring the electrolytic bath at 0.3 m/s and maintaining the temperature of the electrolytic bath at 160° C., to form an Al film having a thickness of 15 μm, on the Re film. The potential of the sample electrode was −0.1 V relative to an Al reference electrode.

Figure 2:
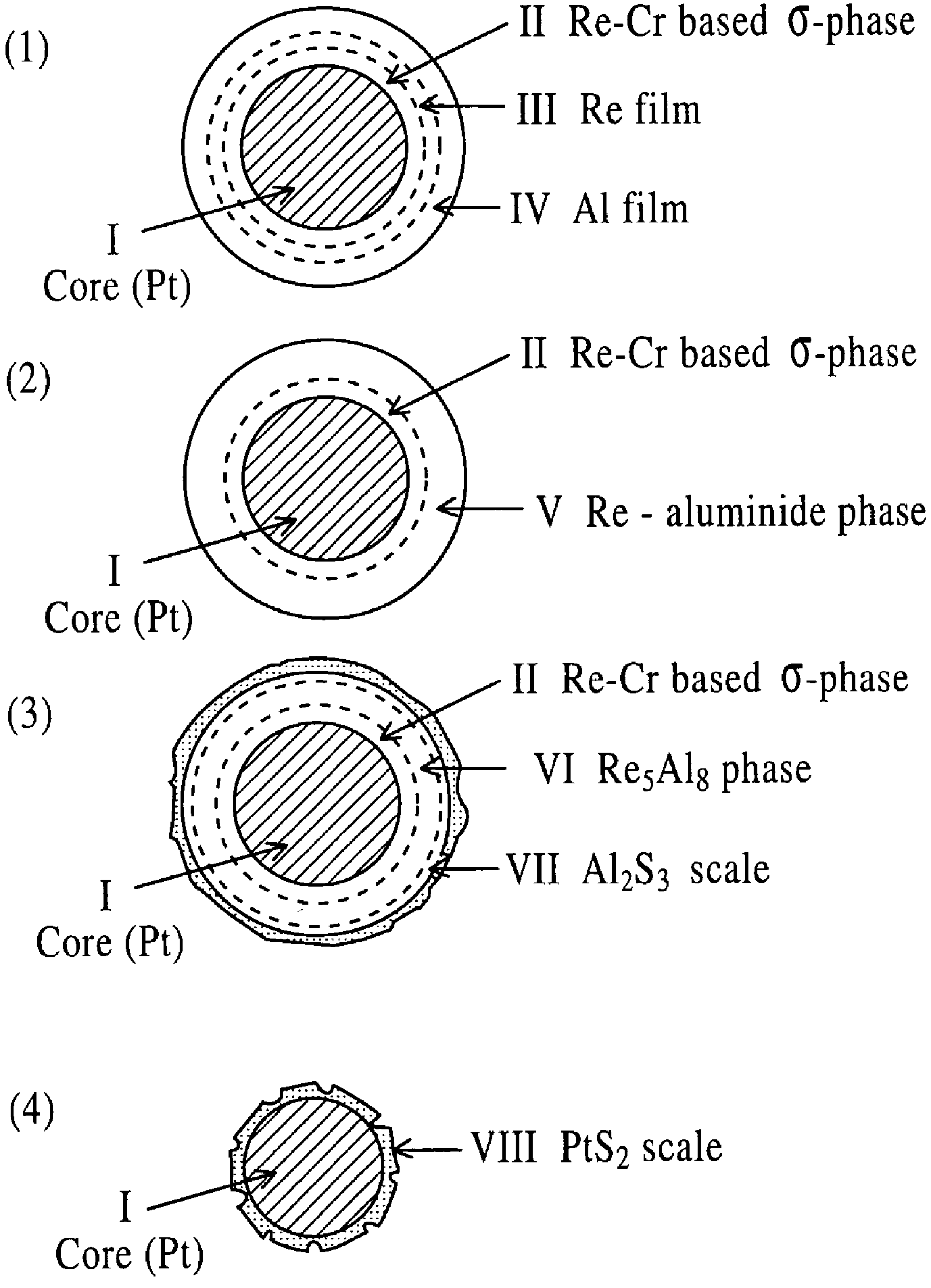
FIGS. 2-(1) to 2-(4) are schematic sectional views showing a wire member in each production process of a resistance heat-generation element in Inventive Example 2 (FIGS. 2-(1) and 2-(2)), and the wire member after a sulfur corrosion test (FIG. 2-(3)): Inventive Example, FIG. 2-(4): Comparative Example).

FIG. 2-(1) is a schematic sectional view showing the structure of the obtained wire member. As illustrated in FIG. 2-(1), a coating film having at least three layers is formed on the periphery of the Pt core I. More specifically, the coating film comprises a core I-side inner layer of the Re—Cr based σ (sigma) phase II, an outer layer of the Re film III, and an outermost layer of the Al film IV.

Then, the wire member was heated up to 600° C. at a heating rate of 10° C./min through an electric current heating process in an inert gas atmosphere, and held for 4 hours. Successively, the wire member was heated up to 1300° C. and held for 1 hour.

FIG. 2-(2) is a schematic sectional view showing the structure of the obtained Pt wire member. As illustrated in FIG. 2-(2), the core I and the inner layer of the coating film are maintained in Pt and Re—Cr based σ-phase II, respectively. The Re film III of the outer layer of the coating film and the Al film IV of the outermost layer of the coating film were formed as an outer layer of a Re-aluminide phase V containing 75 atomic % of Al, through the reaction therebetween.

<Sulfur Corrosion Test>

A sulfur corrosion test was performed by exposing the Pt wire member with the aforementioned coating film, in a mixed gas of 2 vol % of hydrogen sulfide and hydrogen at a temperature of 1000° C. for up to 100 hours. For comparison, a Pt wire member having no coating film was subjected to the same test. The test result is shown in Table 2.

TABLE 2

| Holding Time | Amount of Corrosion ($mg/cm^2$) | |
|---|---|---|
| (hour) | Pt-Re member | Pt member |
| 10 | 1.0 | 1.4 |
| 25 | 1.7 | 2.3 |
| 50 | 2.1 | 7.0 |
| 100 | 3.5 | 12.0 |

The sectional structure of the Pt/Re (Cr)/Re—Al wire member subjected to the sulfur corrosion test was observed to measure the concentration of each element contained in each of the layers using an EPMA apparatus. FIG. 2-(3) is a schematic sectional view showing the structure of the Pt wire member after the test. FIG. 2-(4) is a schematic sectional view showing the structure of Comparative Example, or the Pt wire member having no coating film, after the test. As seen in FIG. 2-(4), in the Pt wire member having no coating film, a cracked $PtS_2$ scale is formed. Further, the corrosion is developed according to a linear rule, as shown in Table 2. In contrast, the Pt wire member in Inventive Example 2 is corroded according to a parabolic rule, and a protective $Al_2O_3$ scale VII is formed as shown in FIG. 2-(3) As seen in FIG. 2-(3), the sectional structure is analogous to that in FIG. 2-(2), or is not changed even after the exposure to the high-temperature atmosphere. However, as compared with FIG. 2-(2), the Re-aluminide phase V in the outer layer of the coating film was converted to a $Re_5Al_8$ phase VI.

As can be seen from the above result, the Pt/Re (Cr)/Re—Al wire member in Inventive Example 2 is sulfurized according to a parabolic rule, and protected by the protective $Al_2O_3$ scale.

INVENTIVE EXAMPLE 3

A resistance heat-generation element comprising a core of Pt and a coating film with an inner layer of Re (Cr—Pt) and an outer layer of Re-silicide was produced through the following process, and subjected to a test for corrosion resistance.

A Pt wire member was subjected to an electroplating process under the same conditions as those in Inventive Example 1 to form a Re—Cr alloy film thereon, and then subjected to an intermediate heat treatment. Then, a Re film was formed under the same conditions as in Inventive Example 2.

Figure 3:
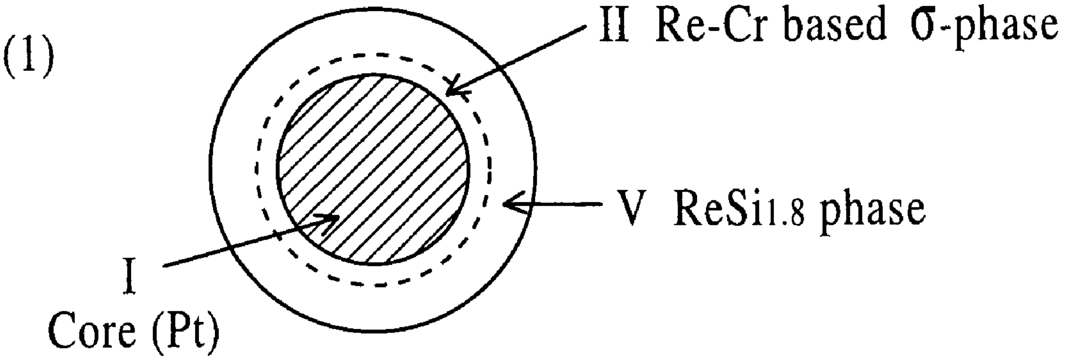
FIGS. 3-(1) and 3-(2) are schematic sectional views showing a wire member in each production process of a resistance heat-generation element in Inventive Example 3.
Figure 3:
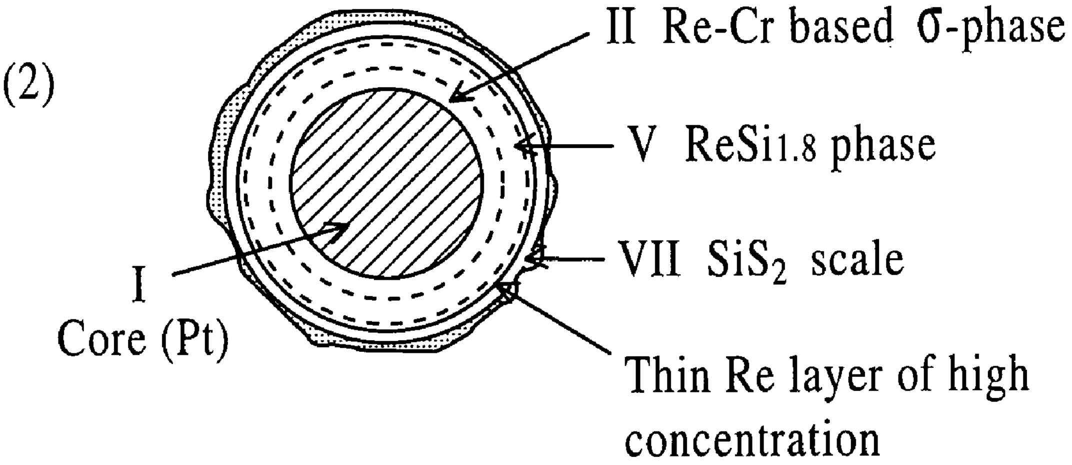

Then, a necessary portion of the Pt wire member formed with the Re—Cr alloy layer and the Re film was immersed in a Si power. In this state, the Pt wire member was heated up to 1300° C. through an electric current heating process in an inert gas atmosphere, and held for 2 hours. FIG. 3-(1) is a schematic sectional view showing the structure of the obtained wire member. As illustrated in FIG. 3-(1), a coating film having at least two layers is formed on the periphery of the Pt core I. More specifically, the coating film comprises a core I-side inner layer of the Re—Cr based σ (sigma) phase II, an outer layer of a $ReSi_{1.8}$ phase III.

<Sulfur Corrosion Test>

A sulfur corrosion test was performed by exposing the Pt wire member with the aforementioned coating film, in a mixed gas of 2 vol % of hydrogen sulfide and hydrogen at a temperature of 1000° C. for up to 100 hours. For comparison, a Pt wire member having no coating film was subjected to the same test. The test result is shown in Table 3.

TABLE 3

| Holding Time | Amount of Corrosion (mg/cm$^2$) | |
|---|---|---|
| (hour) | Pt-Re member | Pt member |
| 10 | 0.2 | 1.4 |
| 25 | 0.5 | 2.3 |
| 50 | 1.0 | 7.0 |
| 100 | 1.5 | 12.0 |

The sectional structure of the Pt/Re (Cr)/Re—Si wire member subjected to the sulfur corrosion test was observed to measure the concentration of each element contained in each of the layers using an EPMA apparatus. FIG. 3-(2) is a schematic sectional view showing the structure of the Pt wire member after the test. As seen in FIG. 3-(2), the Pt wire member in Inventive Example 3 has an extremely small amount of sulfur corrosion, and a thin Re layer of high concentration is formed on the alloy surface below a $SiS_2$ scale VII (containing a small amount of $SiO_2$). It is believed that this Re layer contributes to the excellent sulfurization resistance.

INVENTIVE EXAMPLE 4

A resistance heat-generation element comprising a core of Re—Cr—Pt and a coating film with an inner layer of Re (Cr—Pt) and an outer layer of Cr-aluminide was produced through the following process, and subjected to a test for oxidation resistance.

Figure 4:
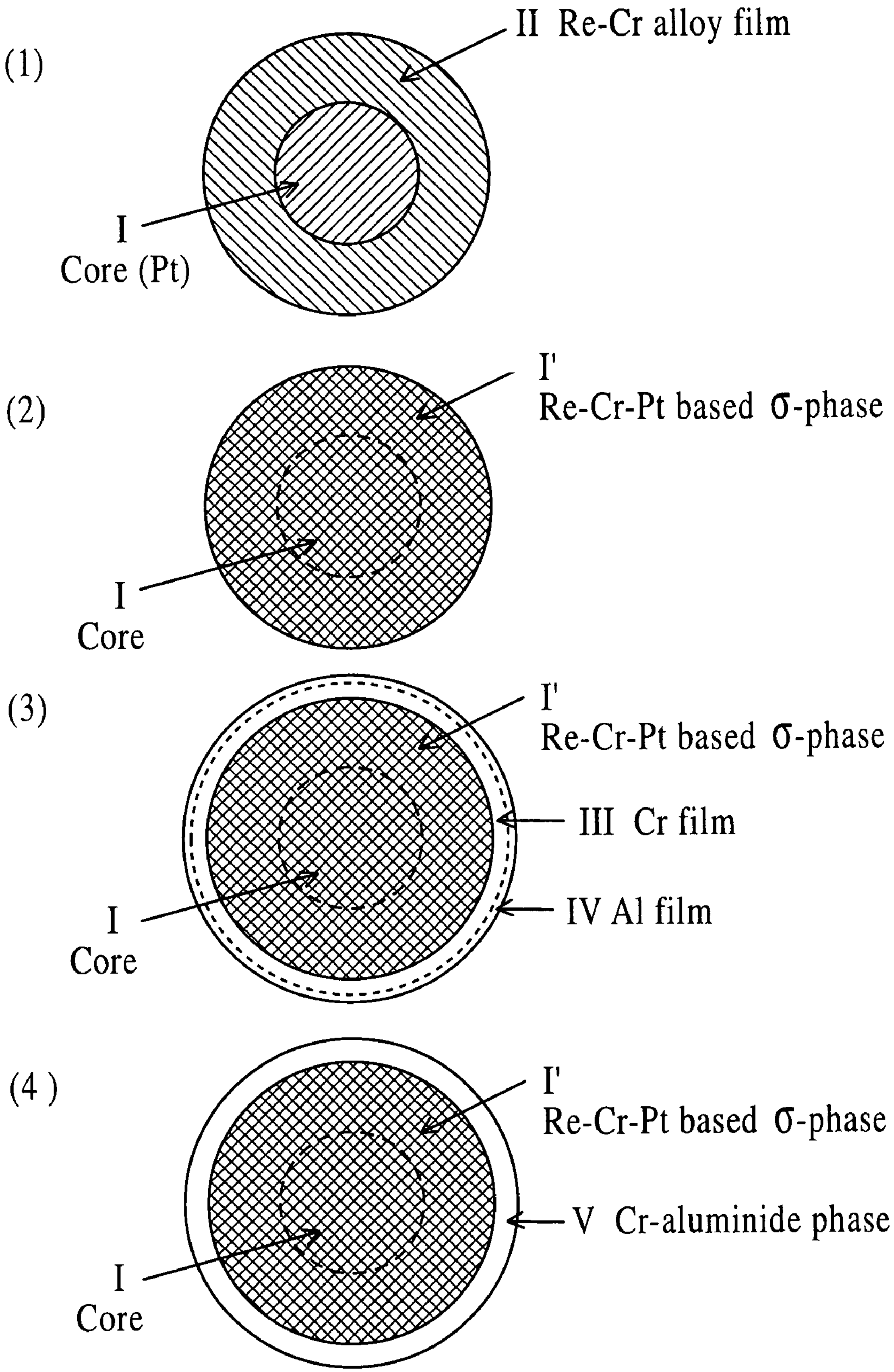
FIGS. 4-(1) to 4-(4) are schematic sectional views showing a wire member in each production process of a resistance heat-generation element in Inventive Example 4.

A Pt wire member was subjected to an electroplating process to form a Re—Cr alloy film thereon, under the same conditions as those in Inventive Example 1 except that the Re—Cr alloy film was formed to have a thickness of 50 μm. FIG. 4-(1) is a schematic sectional view showing the structure of the obtained wire member. As seen in FIG. 4-(1), the Re—Cr alloy film II is formed on the periphery of the Pt core I.

Then, the wire member was heated up to 1600° C. at a heating rate of 10° C./min through an electric current heating process in an inert gas atmosphere, and held for 2 hours, and then subjected to an intermediate heat treatment. FIG. 4-(2) is a schematic sectional view showing the structure of the obtained wire member. As seen in FIG. 4-(2), the Pt core I is converted to a Re—Cr—Pt based σ-phase I' (41 atomic % of Re, 18 atomic % of Cr) containing Pt as a solid solution.

Then, a Cr film having a thickness of 10 μm was formed on the core through an electroplating process using a conventional Sargent Cr-plating bath.

Then, based on the same electrolytic bath as that in Inventive Example 1, an electroplating process was performed using the alloyed wire member coated with the Cr layer as a negative electrode, while stirring the electrolytic bath at 0.3 m/s and maintaining the temperature of the electrolytic bath at 160° C., under the condition that the potential of the sample electrode was −0.1 V relative to an Al reference electrode, to form an Al film having a thickness of 5 μm, on the Cr film. FIG. 4-(3) is a schematic sectional view showing the structure of the obtained wire member. As illustrated in FIG. 4-(3), the Cr film III and the Al film IV are formed on the periphery of the Re—Cr—Pt based σ-phase I'.

Then, the wire member was heated up to 600° C. at a heating rate of 10° C./min through an electric current heating process in an inert gas atmosphere, and held for 4 hours. Successively, the wire member was heated up to 1300° C. and held for 1 hour. FIG. 4-(4) is a schematic sectional view showing the structure of the obtained wire member. As illustrated in FIG. 4-(4), a coating film consisting of a Cr-aluminide phase V is formed on the periphery of the Re—Cr—Pt based σ-phase I'. While the core I has the same composition as that in FIG. 4-(3), the coating film is mainly comprised of a Cr (Al) phase.

<Oxidation Test>

An oxidation test was performed by exposing the above wire member in the normal atmosphere at a temperature of 1500° C. for up to 400 hours. The test result is shown in Table 4.

TABLE 4

| Holding Time (hour) | Amount of Corrosion (mg/cm$^2$) Pt-Re member |
|---|---|
| 100 | 1.5 |
| 200 | 2.5 |
| 400 | 3.3 |

According to the observation result of the sectional structure of the wire member subjected to the oxidation test, while the wire member has a structure similar to that in FIG. 4-(4), the coating film has an Al composition reduced from 47 atomic % to 35 atomic %.

As can be seen from the above result, the (Re—Ce—Pt)/Cr (Al) wire member in Inventive Example 4 is oxidized according to a parabolic rule, and protected by a protective $Al_2O_3$ scale.

INVENTIVE EXAMPLE 5

A resistance heat-generation element comprising a core of Re—Cr—Ta and a coating film with an inner layer of Re (Cr—Ta) and an outer layer of Re-silicide was produced through the following process, and subjected to a test for oxidation resistance.

Figure 5:
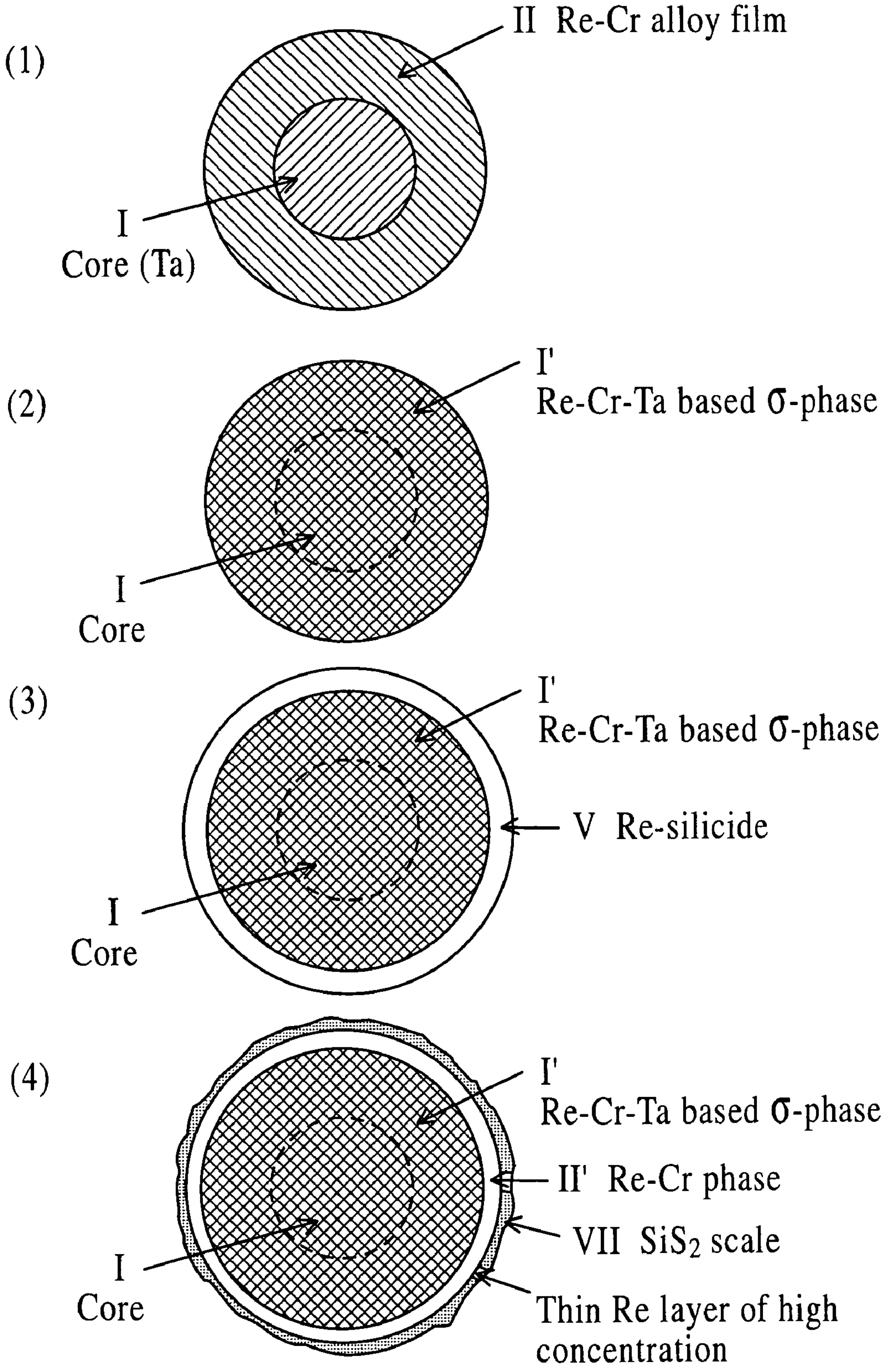
FIGS. 5-(1) to 5-(4) are schematic sectional views showing a wire member in each production process of a resistance heat-generation element in Inventive Example 5 (FIGS. 5-(1) to 5-(3)), and the wire member after a sulfur corrosion test (FIG. 5-(4)).

A Ta wire member was used in place of a Pt wire member, and subjected to an electroplating process under the same conditions as those in Inventive Example 4 to form a Re—Cr alloy film thereon. FIG. 5-(1) is a schematic sectional view showing the structure of the obtained wire member. As seen in FIG. 5-(1), the Re—Cr alloy film II is formed on the periphery of the Ta core I.

Then, the wire member was subjected to an intermediate heat treatment under the same conditions as those in Inventive Example 4. FIG. 5-(2) is a schematic sectional view showing the structure of the obtained wire member. As seen in FIG. 5-(2), the Ta core is converted to a Re—Cr—Pt based a-phase I' containing Ta as a solid solution.

Then, the above Ta wire member was immersed in a Si power. In this state, the Ta wire member was heated up to 1500° C. through an electric current heating process in an inert gas atmosphere, and held for 2 hours. FIG. 5-(3) is a schematic sectional view showing the structure of the obtained wire member. As illustrated in FIG. 5-(3), the core I is formed as the Re—Cr—Pt based σ-phase I' containing Ta as a solid solution, and the coating film is formed as a Re-silicide phase V ($ReSi_{1.8}$+Si) containing 70 atomic % or more of Si.

<Sulfur Corrosion Test>

A sulfur corrosion test was performed by exposing the above Ta wire member in a mixed gas of 2 vol % of hydrogen sulfide and hydrogen at a temperature of 10001° C. for up to 100 hours. For comparison, a Ta wire member having no coating film was subjected to the same test. The test result is shown in Table 5.

TABLE 5

| Holding Time | Amount of Corrosion (mg/cm$^2$) | |
|---|---|---|
| (hour) | Ta/Re(Cr)/Si member | Ta member |
| 10 | 0.1 | 0.4 |
| 25 | 0.4 | 1.3 |
| 50 | 1.0 | 4.0 |
| 100 | 1.4 | 10.0 |

The sectional structure of the Re (Cr—Ta)/Re—Si wire member subjected to the sulfur corrosion test was observed to measure the concentration of each element contained in each of the layers using an EPMA apparatus. FIG. 5-(4) is a schematic sectional view showing the structure of the wire member after the test. As seen in FIG. 5-(4), the Ta wire member in Inventive Example 5 has an extremely small amount of sulfur corrosion, and a Re—Cr phase II'and a thin Re layer of high concentration are formed on the alloy surface below a $SiS_2$ scale VII (containing a small amount of $SiO_2$). It is believed that these layers contribute to the excellent sulfurization resistance.

INDUSTRIAL APPLICABILITY

The present invention can provide a metal-based resistance heat-generation element capable of covering a wide temperature range of room temperature to 2000° C. or more, and usable in various atmospheres (such as oxidation, reduction, vacuum or corrosion atmosphere), and a method for producing the element.

What is claimed is:

1. A metal-based resistance heat-generation element excellent in heat resistance and high-temperature corrosion resistance, comprising:

a heat-generation element member made of a platinum-group metal or refractory metal; and a coating film formed on all surfaces of said heat-generation element member, said coating film including:

a first layer including a Re—Cr based σ (sigma) phase formed by heat treatment of a film made of a Re—Cr alloy or a bilayer film consisting of a Re layer and a Cr layer, and a second layer of an aluminide or silicide, wherein said first layer being disposed closer to said heat-generation element member than said second layer.

2. A method for producing a metal-based resistance heat-generation element excellent in heat resistance and high-temperature corrosion resistance, comprising the steps of:

forming a material made of a platinum-group metal or refractory metal into a shape of a heat-generation element member;

forming on all surfaces of said heat-generation element member a film made of a Re—Cr alloy or a bilayer film consisting of a Re layer and a Cr layer, thereby obtaining a film-coated member;

heat treating said film-coated member so as to convert said film to an inner layer of a Re—Cr based σ (sigma) phase, thereby obtaining a heat-treated member; and subjecting said heat-treated member to an aluminum or silicon diffusion coating so as to form an aluminide or silicide layer on all surfaces of said inner layer.

3. The method as defined in claim 2, which includes the step of forming a Cr film and an Al film on said inner layer of the Re—Cr based σ (sigma) phase, wherein the step of subjecting the heat-treated member to an aluminum or silicon diffusion coating includes subjecting said member with said Cr and Al films to an aluminum diffusion coating at a given high temperature to allow said Cr and Al films to be formed as a Cr-aluminide layer.

4. The method as defined in claim 2, which includes the step of forming a Re film and an Al film on said inner layer of the Re—Cr based σ (sigma) phase, wherein the step of subjecting the heat-treated member to an aluminum or silicon diffusion coating includes subjecting said member with said Re and Al films to an aluminum diffusion coating at a given high temperature to allow said Re and Al films to be formed as a Re-aluminide layer.

5. The method as defined in claim 2, which includes the step of forming a Re film on said inner layer of the Re—Cr based σ (sigma) phase, wherein the step of subjecting the heat-treated member to an aluminum or silicon diffusion coating includes subjecting said member with said Re film to a silicon diffusion coating to allow said Re film to be formed as a Re-silicide layer.

6. A method for producing a metal-based resistance heat-generation element excellent in heat resistance and high-temperature corrosion resistance, comprising the steps of:

forming a material made of a platinum-group metal or refractory metal into a shape of a heat-generation element member;

coating on all surfaces of said heat-generation element member with a film made of a Re—Cr alloy or a bilayer film consisting of a Re layer and a Cr layer, thereby obtaining a film-coated member;

heat treating said film-coated member to diffuse Re and Cr into said member so as to convert said member into a platinum-group or refractory metal-Re—Cr alloy, thereby obtaining an alloyed layer; and subjecting said alloyed layer to an aluminum or silicon diffusion coating so as to form an aluminide or silicide layer on said alloyed layer.

7. The method as defined in claim 6, which includes the step of forming a Cr film and an Al film on said platinum-group or refractory metal-Re—Cr alloy, wherein the step of subjecting the alloyed member to an aluminum or silicon diffusion coating includes subjecting said alloyed member with said Cr and Al films to an aluminum diffusion coating at a given high temperature to allow said Cr and Al films to be formed as a Cr-aluminide layer.

8. The method as defined in claim 6, which includes the step of forming a Re film on said platinum-group or refractory metal-Re—Cr alloy, wherein the step of subjecting the alloyed member to an aluminum or silicon diffusion coating includes subjecting said alloyed member with said Re film to a silicon diffusion coating to allow said Re film to be formed as a Re-silicide layer.

* * * * *